United States Patent [19]
Rice et al.

[11] Patent Number: 5,625,279
[45] Date of Patent: Apr. 29, 1997

[54] DC-DC CONVERTER WITH DYNAMICALLY ADJUSTABLE CHARACTERISTICS

[75] Inventors: Huston W. Rice; George Barbehenn, both of Vancouver, Wash.

[73] Assignee: Hewlett-Packard Company, Palo Alto, Calif.

[21] Appl. No.: 625,573

[22] Filed: Mar. 28, 1996

[51] Int. Cl.$^6$ .................................................. H02M 3/335
[52] U.S. Cl. ............................................................ 323/283
[58] Field of Search ................................ 363/21; 323/283

[56] References Cited

U.S. PATENT DOCUMENTS 5,272,614 12/1993 Brunk et al. ................................ 363/21

OTHER PUBLICATIONS

Motorola applic. note AN920, ©1989 "Theory and Applications of the MC34063 and µA 78540 Switched regulator Control Circuits", pp. 1–18 (Design & Theory).

*Primary Examiner*—Aditya Krishnan

[57] ABSTRACT

A switching DC-DC converter, with regulation of the output, is disclosed. Unlike prior art converters, the source of the switching signal is not a free-running oscillator, but a rectangular waveform whose frequency and duty cycle parameters are under the control of an external processor. By appropriately varying these parameters, the processor dynamically modifies the characteristics of the converter, in effect optimizing its design to deal efficiently with different operating states such as circuit startup, sudden load changes the processor "knows" about in advance, and even design changes over the life of the converter. Once the processor sets up appropriate parameters for an existing or anticipated state, a hardware feedback loop regulates the output voltage of the converter by reducing the width and/or number of switching pulses. Thus, the processor is not part of the voltage regulation process but is free to devote attention to other parts of the system in which the converter resides.

14 Claims, 8 Drawing Sheets

DC-DC CONVERTER WITH DYNAMICALLY ADJUSTABLE CHARACTERISTICS

FIELD OF THE INVENTION

The present invention relates to DC-DC converters/regulators, and more particularly, to switching converters which must operate efficiently over a variety of operational states.

BACKGROUND OF THE INVENTION

DC-DC converters are a class of electronic circuit whose input is one DC voltage level—not necessarily constant—and whose output is another DC level. A load is connected to the output, and the converter, in addition to converting the input voltage level to the output level, usually regulates the output level. This means it maintains the output voltage approximately constant against changes in the input level or changes of load value. (The term "regulator" is often used interchangeably with converter.)

Early designs for such converters commonly consisted of a variable resistance inserted between the source supplying the input level and the load. A control circuit monitored the voltage across the load and dynamically adjusted the variable resistance to maintain the load voltage at the desired level.

More recently, switching DC-DC converters have greatly increased in popularity. Typically, a switching converter uses an electronic switch to chop the source voltage. The resultant pulsed waveform is filtered to reduce its AC component, and thus its average (DC) value is supplied to the load. The average value is controlled through varying the pulsed waveform; for example, changing its duty cycle, or omitting some of the pulses. Switching converters/regulators are usually more efficient than the variable resistance type, and this is a major reason for their popularity. In addition, with proper converter topology, output voltages higher than the input, or of opposite polarity, may be generated. Application Note AN920 from Motorola, Inc. is a good source both for understanding switching regulators and for a background to principles of the present invention. This Note, "Theory and applications of the MC34063 and µA78S40 switching regulator control circuits", is hereby incorporated by reference in this disclosure.

Figure 1:
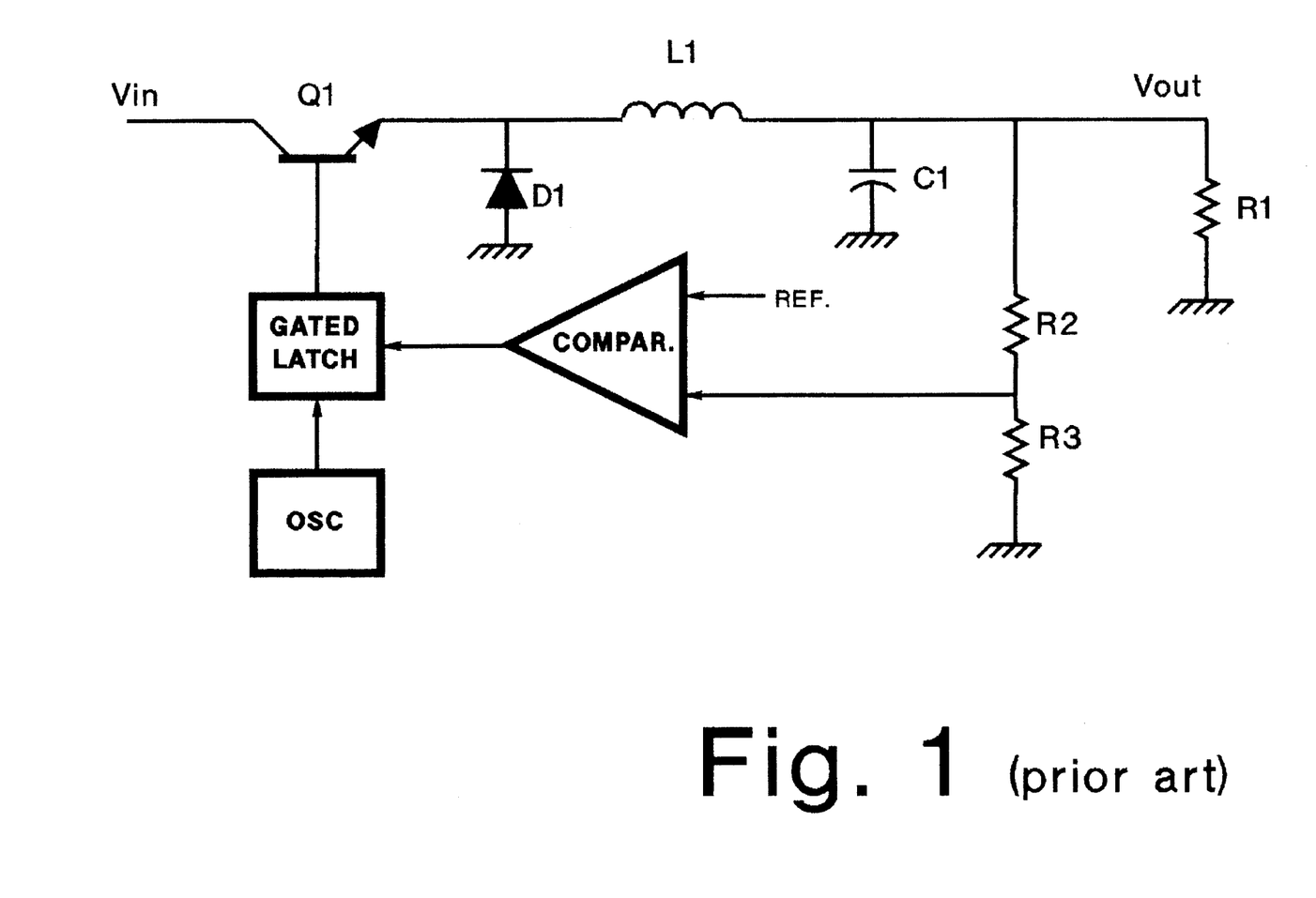
FIG. 1 is a simplified circuit diagram of a prior-art converter of design related to the present invention.

FIG. 1 is similar to FIG. 1b of the Motorola reference, and shows a simplified switching DC-DC converter. A DC source Vin is applied, via a switching transistor Q1, to a filter network consisting of elements D1, L1, and C1. A load R1 dissipates the filtered power at a voltage level Vout. When Vout (scaled by R2 and R3) is less than a reference voltage REF, the comparator enables the gated latch. The latch accepts pulses from the free-running oscillator and delivers a pulsed drive to the base of Q1. When V1 is thus switched on and off, it supplies a pulse train of height Vin to the filter network. However, when the filtered value Vout of this train rises above its nominal value, the comparator disables the latch, thus turning off Q1. As R1 draws energy from the filter network, Vout decays below its nominal value and the comparator re-enables the latch. This "bang-bang" control circuit holds Vout close to its nominal value even if Vin and/or R1 change.

The converter design scheme shown in the Motorola reference is effective, yet there are some operating states of the circuit which cause difficulty.

One of these is circuit startup: when power is first applied, the circuit must bring up the output voltage from zero to Vout. This means pumping charge into C1 until its terminal voltage reaches Vout. Since the voltage across C1 is initially zero, L1 is subject to the full value of voltage Vin, resulting in current pulses through Q1 and the filter elements which can reach damaging levels much higher than those experienced in steady-state operation.

Another difficulty can occur when the load R1 suddenly changes value from very large to very small, or vice versa. This is a commonplace occurrence in thermal inkjet printers, the design environment in which the present invention was conceived. In these printers, large current pulses of short duration are applied to ink-propelling resistors. Although the printer controller "knows" in advance when these loads are to occur, this information is not used to prepare the converter to allow better handling of the resulting transients.

Yet another problem results when design requirements change or when component values must be modified. Unless corresponding changes are made in the duty cycle and/or the frequency of the oscillator, the circuit in its new state may operate at less than best efficiency.

Operational problems such as these reveal the need for a converter circuit whose characteristics can be modified dynamically to match more closely actual or anticipated operating state changes, whether short-term, such as startup, or long term, such as different values of filter components.

SUMMARY OF THE INVENTION

A switching DC-DC converter for efficiently converting an unregulated DC input to a lower, regulated output voltage is described. Characteristics of the switching signal for the converter are controlled by an external controller which can vary the signal frequency, its duty cycle, or combinations of these.

The external controller dynamically adjusts the switching signal to adapt the converter characteristics to different operating states. The controller either monitors the operating state or, because it also governs other variables as, for instance, load value, it "knows" that a change of state is imminent. In the latter case, the controller can adjust the switching signal in advance of the state change in order to minimize transient disturbance of the regulator loop.

Unlike prior art, most of the components of the converter are digital, which facilitates circuit integration and its attendant size and cost reductions.

Initial application of power (startup) is a common short term converter state. In some prior art converters, dangerously high currents often flow during startup because a filter capacitor must be charged from zero volts to the output voltage. In this embodiment of the invention, during startup the controller supplies a switching waveform with a short "on" time, which limits the peak inrush current to a safe value. When the capacitor is fully charged, the controller returns the switching waveform to what is appropriate for a steady state load.

Other states for which the controller can make appropriate adjustments to the switching waveform include changes in environmental conditions (especially temperature), component values, and sudden changes in load value. In the latter case, for example, the controller may momentarily increase the possible "on" time just prior to a sudden increase in load current, thus enabling a more rapid recovery from such a transient.

In this embodiment, the controller is not part of the feedback loop which maintains a constant output voltage.

Rather, the controller, by varying the switching parameters, modifies the converter performance characteristics as a function of its operating state. This avoids dangerous operating conditions, improves overall efficiency, and enables the feedback loop to do a better job of controlling the output voltage over a range of operating states. It also frees the controller, which is typically a microprocessor, to manage other system tasks.

Although the disclosed embodiment concerns a step-down converter, the inventive principles apply equally to step-up converters, polarity-reversing converters, etc.; that is, to any topology of switching converters.

BRIEF DESCRIPTION OF THE DRAWING

FIG. 4a is a typical oscillator waveform of the present invention for a mid-range load.

FIG. 4b is a typical partial-pulse latch circuit (switch drive) waveform corresponding to FIG. 4a.

FIG. 5b is a typical pulse-swallowing latch circuit (switch drive) waveform corresponding to FIG. 5a.

FIG. 5c is the comparator waveform corresponding to FIG. 5b.

DETAILED DESCRIPTION OF THE PREFERRED EMBODIMENT

Figure 2:
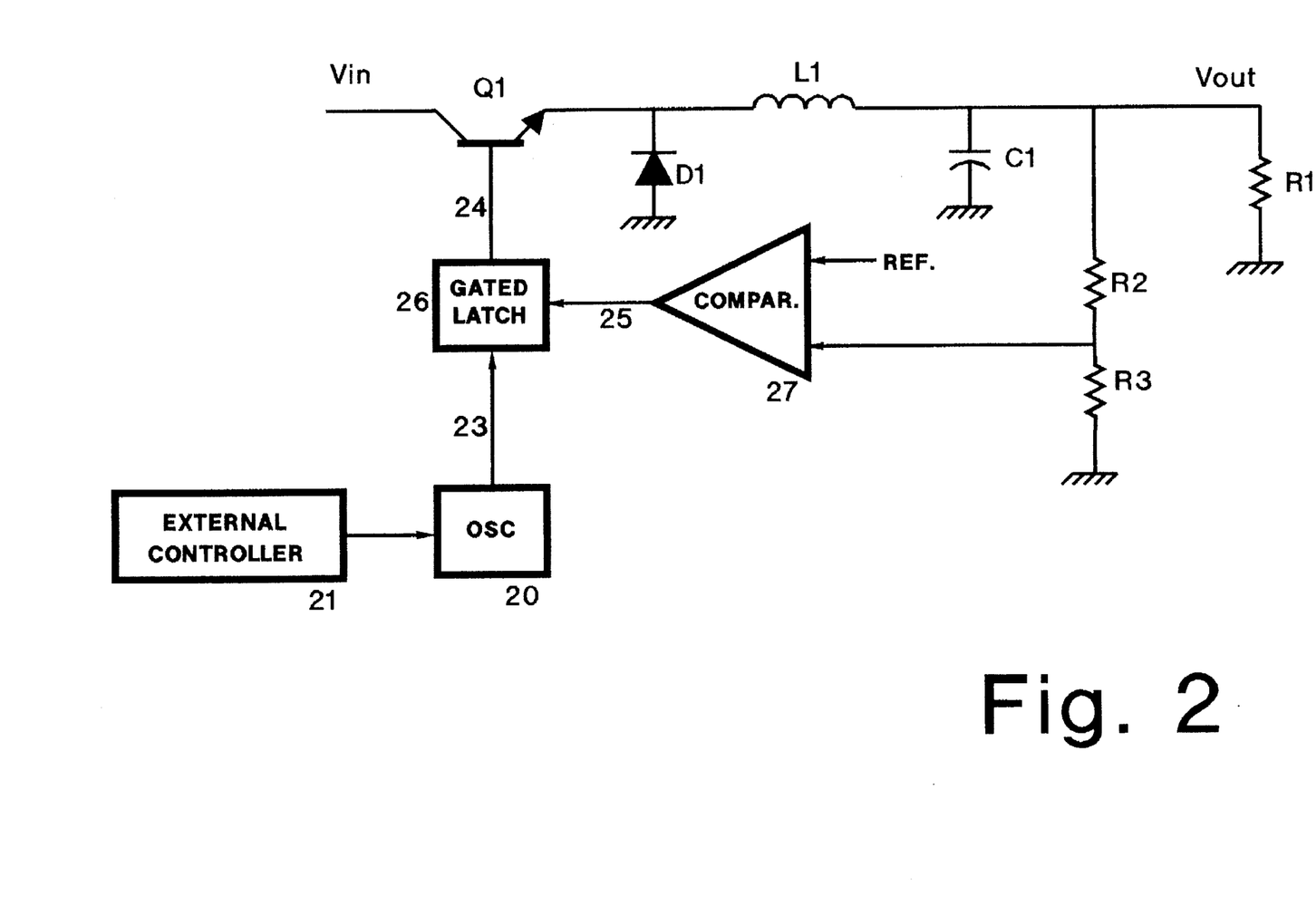
FIG. 2 is a simplified circuit diagram of an embodiment of the present invention.

Refer now to FIG. 2, which illustrates aspects of a preferred embodiment of a DC-DC converter according to the present invention. Compared with the prior art illustrated in FIG. 1, oscillator 20 is no longer free running, but is under the control of external controller 21. Controller 21 is a microprocessor system which regulates most of the operation of a thermal inkjet printer. This includes managing the DC-DC converter of the present disclosure.

In this embodiment, a preferred manner for generating an oscillator signal is for controller 21 to pass integers N1 and N2 as terminal counts to two coupled counters within oscillator block 20. These counters are clocked with a 16 MHz system clock. The first counter is arranged to determine the duration of the HIGH output state of the oscillator signal appearing on line 23, while the second counter determines the duration of the LOW state of the signal. So, for instance, setting N1=58 and N2=6 would generate a 250 KHz, 90.6% duty cycle oscillator signal on line 23: 58P seconds HIGH and 6P seconds LOW, where P is the period of the 16 MHz system clock (62.5 nanoseconds). It is evident that, by varying the values of N1 and N2, a wide range of values of oscillator frequency and duty cycle can be generated, and that the values can be changed dynamically by controller 21. The externally adjustable oscillator frequency and duty cycle of the present disclosure vs. the usual fixed waveform (such as the fixed frequency, 6/7 duty cycle oscillator of the Motorola reference) lead to several novel capabilities which will be explained shortly.

The oscillator signal is supplied via line 23 to a gated latch 26, which converts the logic levels into appropriate drive levels for switch Q1. The drive signal for Q1 is supplied on line 24. In ways which are described later, latch 26 modifies the drive signal by reducing the total fraction of its HIGH (ON) time, compared with the HIGH time of the oscillator. Two versions of latch 26 are disclosed, and the operation of each is influenced by comparator output 25. The first version can narrow the width of, or eliminate some drive pulses and is designated the "partial pulse" latch; the other version eliminate some whole pulses and is called the "pulse swallowing" latch. In both cases, reducing the HIGH time of the drive waveform is part of the mechanism for regulating the output voltage, and is described in the Motorola reference and numerous other prior art references.

Figures 4A, 4B:
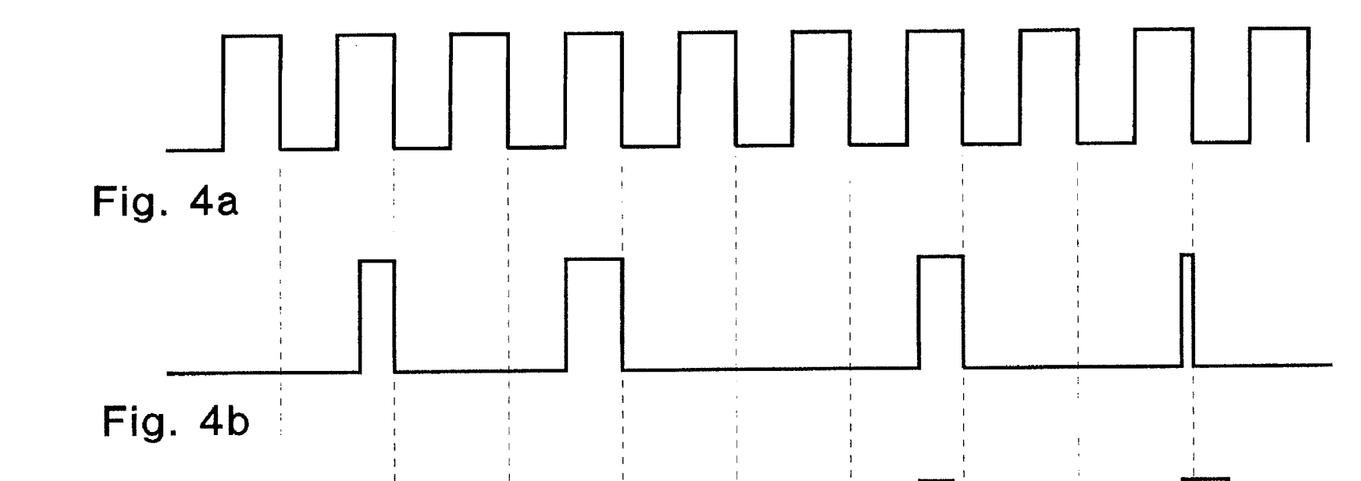
Figure 4C:
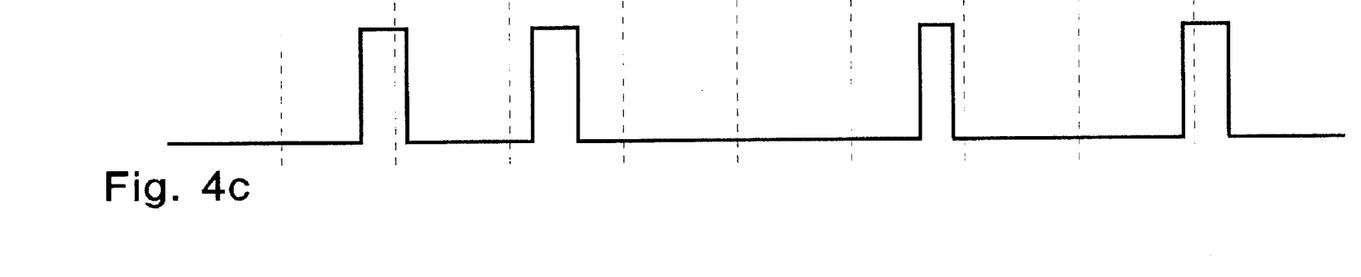
FIG. 4c is the comparator waveform corresponding to FIG. 4b.
Figure 6A:
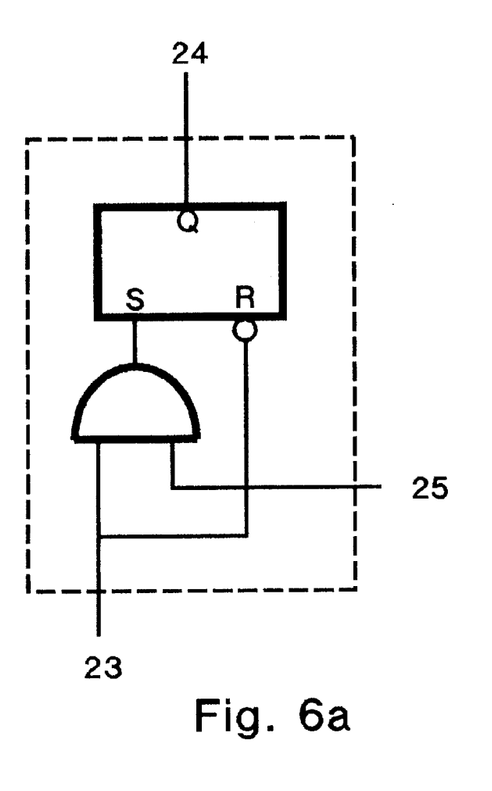
FIG. 6a is a partial-pulse latch circuit.

Operation of the voltage control feedback loop is thoroughly explained in the Motorola reference. An example of a partial pulse latch—the kind used in the Motorola circuit—is also shown in FIG. 6a of this disclosure. Depending on the value of Vout, the comparator-latch allows combinations of no oscillator pulses, partial oscillator pulses, or full oscillator pulses to propagate to switch Q1. For the present embodiment, such operation is illustrated with the waveform charts of FIG. 4. The oscillator waveform on line 23 is shown in FIG. 4a. This is a 50% duty cycle waveform, a value which controller 21 would normally set when the load current in R1 is a little less than half the maximum expected. FIG. 4c illustrates the comparator output on line 25. The comparator's output is a function of the load voltage Vout, and it is completely asynchronous with the oscillator. A drive pulse is inhibited until the comparator goes HIGH, but, once enabled, it stays HIGH until the falling edge of the oscillator waveform. The drive pulses resulting from various comparator waveform timings are seen in FIG. 4b. The drive signal is always LOW during the low portion of the oscillator waveform. As a consequence of all this, the oscillator duty cycle becomes an upper bound for the proportion of the drive signal at HIGH level.

It is reasonable to ask, why not set the duty cycle at the value needed for maximum load—the Motorola circuit sets the duty cycle at 6/7, for instance—and then let the feedback loop regulate the output voltage by varying the pulse HIGH time as explained above? In other words, why is it advantageous to control the duty cycle and/or frequency of the oscillator, as disclosed herein? In fact, there are numerous advantages for doing this, and several are cited herein. As an aid to understanding them, it is helpful to observe that controlling the oscillator waveform varies the upper bounds a) on the size of the charge "packet" supplied to the filter each oscillator cycle and b) on the rate at which packets can be supplied. Thus, controller 21 can dynamically adjust the converter characteristics according to the requirements of its present (or anticipated) state. The controller does not participate in regulating Vout, and is therefore not required to devote its full-time attention to the converter.

One advantage achieved in this embodiment is minimizing the ripple (AC component) of Vout. Ideally, minimum ripple would be achieved if the converter supplied just enough charge every oscillator period to replace the charge absorbed by the load in that time. This would not only minimize the peak-to-peak ripple magnitude but would maximize its frequency; both effects make it easier to filter the ripple. In the prior art case, the waveform has been set to the fixed, high duty cycle needed for maximum load. But when there is a light load, the comparator will sometimes change state early in an oscillator period and Q1 will be ON for most of the period. This overcharges C1 and thus causes Vout to rise substantially above its nominal value. The comparator will then disable latch 26 for as long as needed for the charge in C1 to decay and for Vout to return to its normal range, resulting in a long transient of substantial amplitude. By contrast, when there is a light load in the operation of the disclosed invention, the controller can dynamically reduce the oscillator duty cycle to correspond with the actual load current flowing at the moment.

Figure 3:
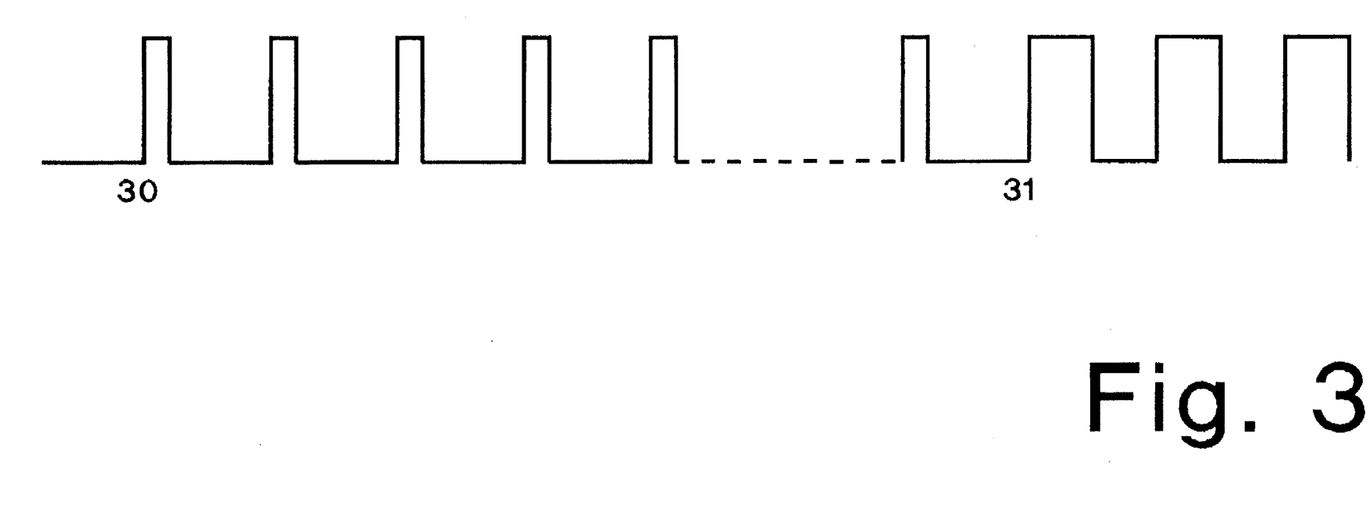
FIG. 3 is a typical switching waveform pattern showing a transition from start-up to a normal converter load.

Yet another advantage of controlling the oscillator duty cycle can be seen for the case of initial application of power to the converter, known as "start up". At the beginning of the start up state, C1 has no charge, and hence no terminal voltage. So, when Q1 is first turned on, the full value Vin (rather than Vin-Vout) is applied across L1. The resulting current ramp can reach dangerous levels if it is allowed to continue increasing. In prior-art converters, safe operation during start up is called "soft start" and additional components are needed to implement this feature. In this embodiment, controller 21 implements a soft start by reducing the oscillator duty cycle (and possibly its frequency) during a start up interval, beginning at 30 in FIG. 3, which shows an oscillator waveform during start up. At some later time 31, after C1 is charged, controller 21 increases the duty cycle to an appropriate value for the anticipated load. Time 31 could be determined by monitoring, say, the comparator output. However, if the startup sequencing is not particularly critical, it is simpler just to wait a predetermined time and then change the duty cycle for the steady-state condition. In a printer in which an embodiment of the present invention was installed, 5 milliseconds is adequate for fully charging C1 and the soft start is completed while other initializing steps are carried out.

Figure 7A:
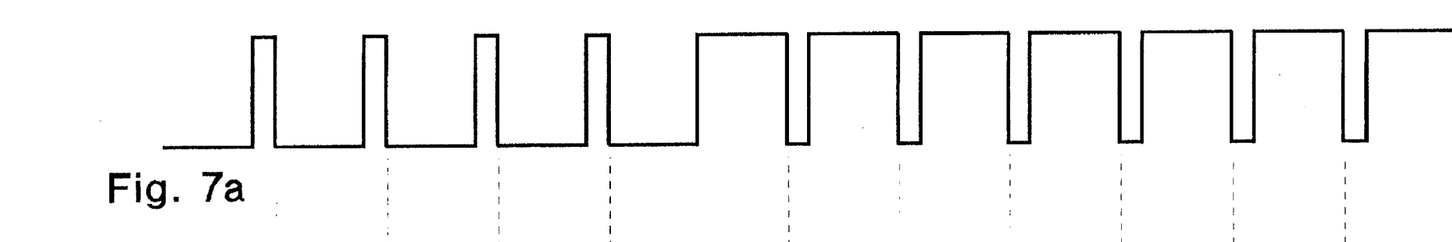
FIG. 7a is a typical oscillator waveform appropriate for a transition from a light load to a heavy load.
Figures 7B, 7C:
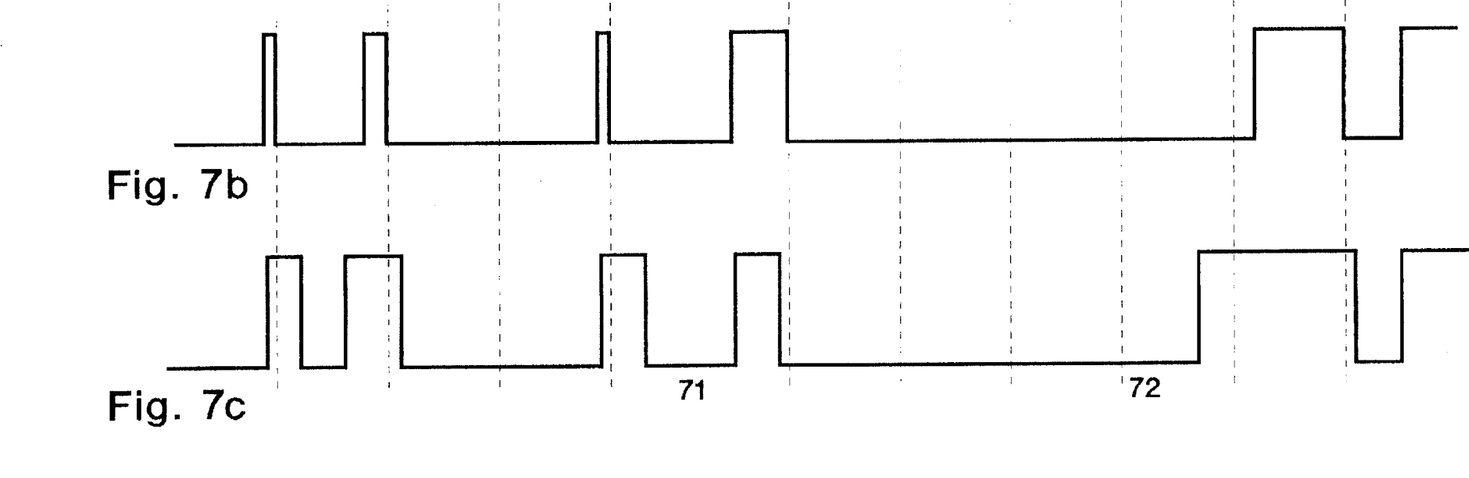
FIG. 7b is a typical partial-pulse latch circuit waveform for a transition from a light load to a heavy load.
FIG. 7c is the comparator waveform corresponding to FIG. 7b.

Still another advantage of the disclosed invention is seen in a situation related to the start up state. This occurs when the converter load changes value from light to heavy (or vice-versa). In many applications of such a converter, such as the inkjet printer already mentioned, load changes are "known" in advance by the system controller, which, of course, is processing the data causing the load change. For instance, the printable data may change from a line of decimal points to black squares, suddenly requiring a lot more ink (and DC power) to print. Such a change of state is represented in the waveforms of FIG. 7. The light load required by the printed decimal points is evident in the oscillator signal shown in the first part of FIG. 7a. This is a low duty cycle waveform appropriate to a light load. At time 71—before the load current increases—controller 21 increases the duty cycle of the oscillator, thus modifying the converter characteristics so that it is ready to supply the larger current needed at time 72. FIG. 7c is the comparator waveform, and FIG. 7b is the corresponding drive waveform from partial pulse latch 26.

A further advantage of the disclosed invention derives from its capability of controlling the oscillator frequency without necessarily modifying its duty cycle. Often, during the lifetime of a design such as the preferred embodiment exemplifies, improved components become available. These might include faster switching diodes and transistors, higher Q inductors, lower series resistance capacitors, etc. In such cases, it is advantageous to use smaller filter components L1 and C1 and to raise the switching frequency accordingly. In the disclosed invention, this is readily accomplished by a software or firmware change of N1 and N2.

A related advantage is the ability to "customize" the switching waveform for the particular filter values in each instance of the circuit, optimizing its operation and thus eliminating problems caused by component tolerances. This advantage also applies in the case where component values are affected by the environment. For instance, the controller can refer to a stored table to relate the measured temperature to switching parameters, and adjust the switching accordingly.

The complete oscillator control incorporated in this embodiment offers another advantage in certain cases. For instance, in the ink jet printer, a sensitive A/D converter must make occasional measurements of temperature or other variables. During the A/D conversion interval—typically, 100 microseconds—the processor can shut off the oscillator, thus greatly reducing electrical noise which might contaminate the measurement. Such an interval is usually short enough that the disturbance on Vout is inconsequential.

Figure 6B:
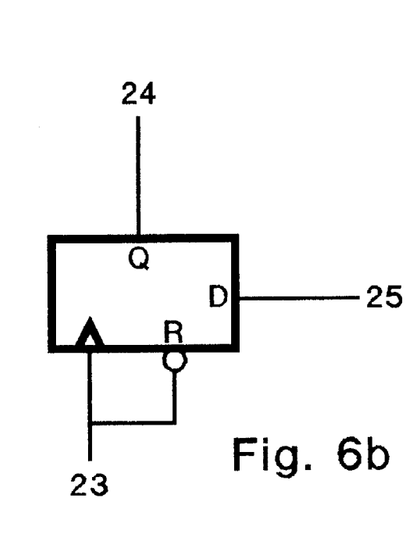
FIG. 6b is a pulse-swallowing latch circuit.

An implementation of the pulse swallowing version of the latch is shown in FIG. 6b. This is a "D" flipflop, clocked by the oscillator signal and enabled by the comparator output. The oscillator signal is also connected to a negative edge-triggered RESET input to insure that the flipflop is reset by the trailing edge of the signal. This elementary circuit acts as a pulse swallower: if the comparator output 25 is LOW during the rising edge of the oscillator signal, the latch remains low for that period.

Figure 5A:
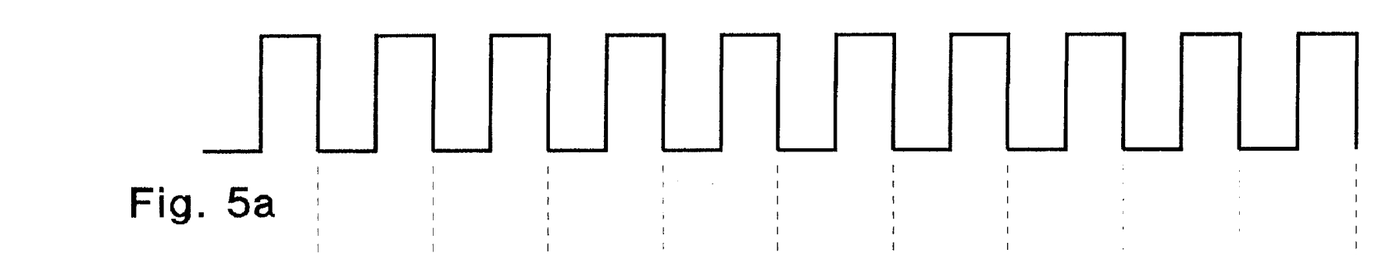
FIG. 5a is a typical oscillator waveform of the present invention for a mid-range load.
Figures 5B, 5C:
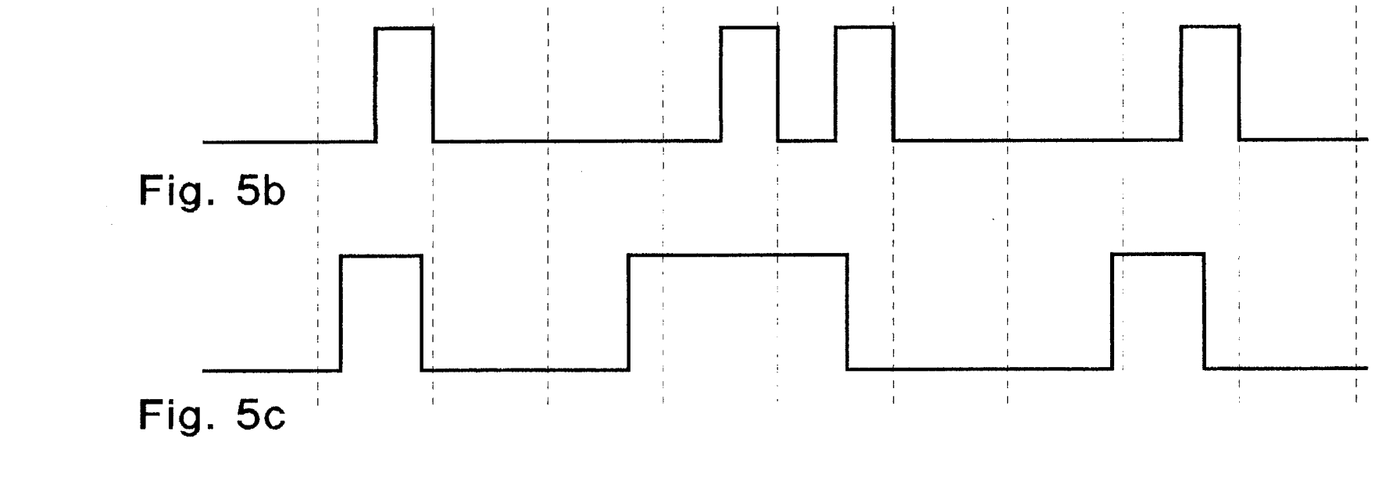

FIG. 5 illustrates some typical waveforms associated with the operation of this latch in the preferred embodiment, and allows comparison with the waveforms (FIG. 4) of the partial pulse implementation. FIG. 5a illustrates a 50% duty cycle oscillator signal on line 23. Comparator output 25 is shown in FIG. 5c, and the resultant drive signal appears in FIG. 5b.

Ripple reduction is less effective using the pulse swallow latch. For instance, if the duty cycle is set to supply slightly more current than the load requires, Vout will gradually rise until the comparator causes one or more drive pulses to be missed. The resulting ripple magnitude will approximate the hysteresis voltage of the comparator. Still, this performance is substantially better than that of prior art circuits, even those using partial pulse latches, and is quite adequate for less critical applications.

Figure 8:
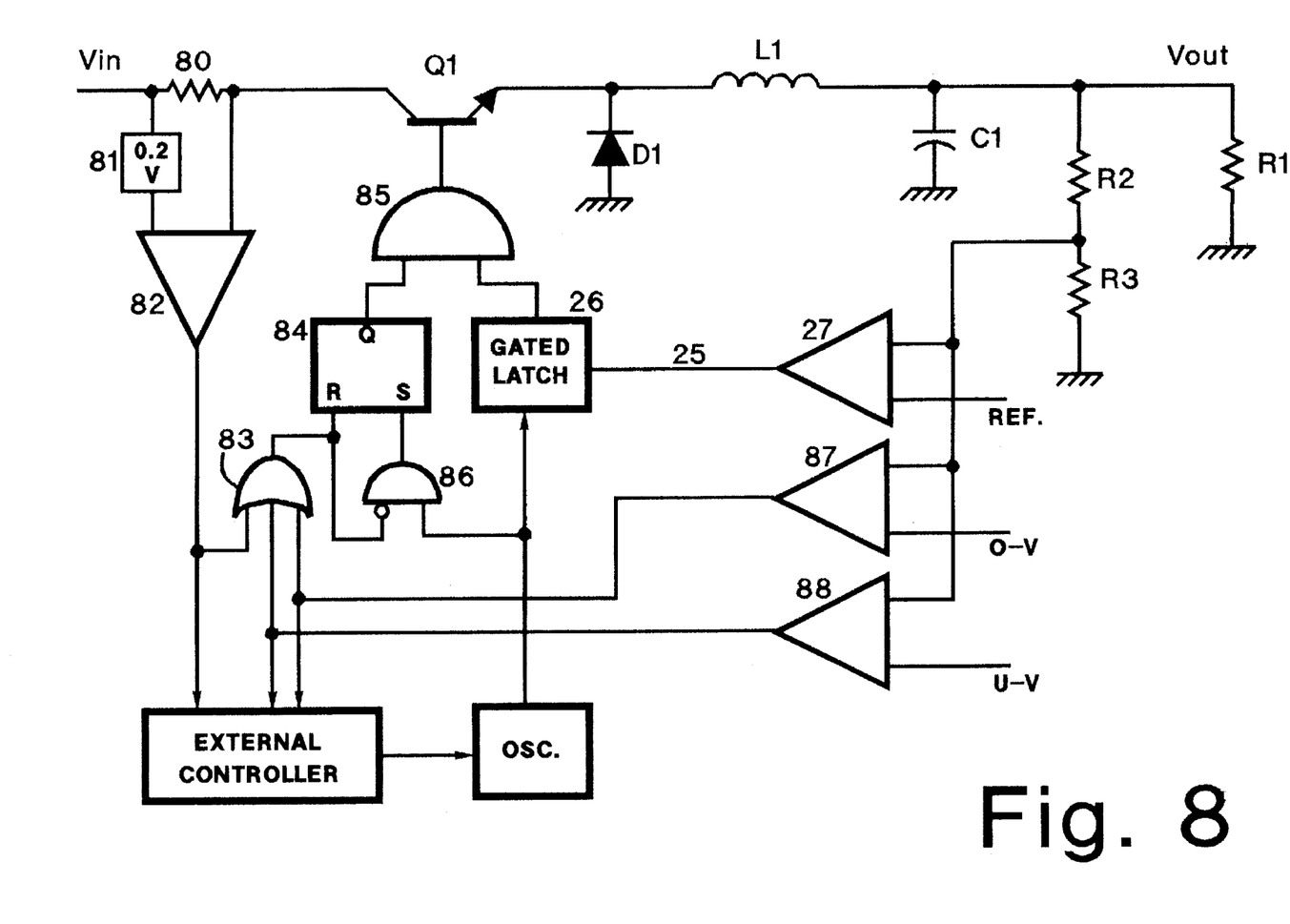
FIG. 8 is a diagram of a further embodiment of the invention, incorporating additional control variables.

FIG. 8 illustrates that the preferred embodiment of FIG. 2 may be readily augmented by incorporating several other variables in the control of the converter. These include the events of over-voltage, under-voltage and over-current. Comparator 82 generates an over-current control signal when the voltage across current sense resistor 80 is greater than an offset voltage (typically 0.2 volts) applied by device 81. Comparators 87 and 88, with reference inputs "O-V" and "U-V", are responsible for generating control signals when Vout goes outside the over- or under-voltage limits, respectively. The signals from comparators 82, 87, and 88 are supplied to OR gate 83, whose output resets fault latch 84. The output of latch 84, when reset, turns off the drive to switch Q1, via AND gate 85. It is seen that the switch drive remains off for the length of a short-duration fault. When the fault disappears, the next positive oscillator edge sets latch 84, and circuit operation resumes.

This embodiment, with its augmented features, is realized using largely digital hardware, facilitating the integration of most of the circuitry in an LSI device.

In addition to their connections for disabling the switch drive, the comparator outputs are shown connected directly to the external controller, which is thereby "informed" of the existence of a particular fault. This topology allows instant shutdown of the converter when a fault occurs, together with further action by the controller if the fault persists beyond some programmed time. However, many design variations are possible. For instance, in some applications, occasional short-term faults can be tolerated. In these cases, the fault-detecting comparators would not directly inhibit switching, as shown in FIG. 8, but would only inform the external controller when a fault occurs. Specific response times and actions would then be programmed. In other applications, it might not be necessary to inform the external controller of a fault, but local shutdown could be relied on to prevent possible circuit damage. However, in these cases, some controller action might be required to deal with low frequency relaxation oscillations which can occur.

We have described and illustrated the principles of our invention with reference to a preferred embodiment; however, it will be apparent that the invention can be modified in arrangement and detail without departing from such principles. For instance, modifying the converter topology as shown in the Motorola reference FIG. 7b and FIG. 7c will change the mode of operation to step-up and inverting, respectively. Those modes of operation will also be enhanced by applying the principles disclosed herein. It will be recognized that the detailed embodiment is illustrative only, and should not be taken as limiting the scope of our invention. Rather, we claim as our invention all such variations as may fall within the scope and spirit of the following claims and equivalents thereto.

What is claimed is:

1. A switching DC-DC converter incorporating a feedback loop for regulating the voltage across an output load, and operable in any of a plurality of different operating states, the converter comprising:
    a switching element having an input connected to a DC power source, an output, and a switching control input;
    a filter circuit having an input connected to the output of the switching element and an output supplying filtered a DC voltage to the output load;
    a latching circuit having first and second inputs and an output coupled to the control input of the switching element;
    a comparator circuit having a first input connected to a reference voltage, a second input connected to a voltage representative of the voltage across the output load, and an output coupled to the first input of the latching circuit; and
    an oscillator circuit having an output supplying a oscillator signal to the second input of the latching circuit, and a control input for adjusting the waveform of the oscillator signal; and
    a digital controller having means for determining a converter operating state, and an output coupled to the oscillator circuit control input for adjusting the oscillator signal according to the converter operating state.

2. A DC-DC converter, as recited in claim 1, in which the latching circuit is a partial-pulse version.

3. A DC-DC converter, as recited in claim 1, in which the latching circuit is a pulse-swallowing version.

4. A DC-DC converter, as recited in claim 1, in which the oscillator signal waveform is nominally rectangular, and the control input of the oscillator circuit includes means for adjusting the frequency and duty cycle of the waveform.

5. A DC-DC converter, as recited in claim 4, in which the rectangular waveform is generated by programmable counters clocked by a system clock, the waveform frequency and duty cycle being adjustable by programming the counters with appropriate count numbers supplied via the control input.

6. In a switching DC-DC converter incorporating a feedback loop for regulating the voltage across an output load, and operable in any of a plurality of different operating states, a method for dynamically adjusting the converter characteristics according to the particular requirements of an operating state, the method comprising the steps of:
    incorporating in the converter a switching signal having an adjustable waveform;
    determining, with a digital controller, a converter operating state;
    identifying the parameters of an appropriate switching signal waveform corresponding to the operating state; and
    adjusting, with the digital controller, the waveform of the switching signal to incorporate the parameters identified in the identifying step.

7. A method for dynamically adjusting a DC-DC converter, as recited in claim 6, in which the switching signal waveform is nominally rectangular, the identifying step comprises identifying appropriate frequency and duty cycle parameters for the waveform, and the adjusting step comprises adjusting the frequency and duty cycle of the waveform.

8. A method for dynamically adjusting a DC-DC converter, as recited in claim 7, in which the identifying step further comprises the digital controller's evaluating an algorithm relating the plurality of operating states with corresponding signal frequencies and duty cycles.

9. A method for dynamically adjusting a DC-DC converter, as recited in claim 7, in which the identifying step further comprises the digital controller's accessing data pairing each operating state with a corresponding signal frequency and duty cycle, the data residing in a stored table accessible to the digital controller.

10. A method for dynamically adjusting a DC-DC converter, as recited in claim 9, the data in the stored table being changed whenever warranted by changed design or application requirements.

11. In a switching DC-DC converter incorporating a feedback loop for regulating the voltage across an output load, and operable in any of a plurality of different operating states, a method for dynamically adjusting the converter characteristics according to the particular requirements of an anticipated operating state, prior to the converter's entering the state, the method comprising the steps of:
    incorporating in the converter a switching signal having an adjustable waveform;
    determining, with a digital controller, an anticipated converter operating state to be entered at a future time;
    identifying the parameters of an appropriate switching signal waveform corresponding to the anticipated operating state; and at an appropriate time prior to the beginning time of the anticipated state, adjusting, with the digital controller, the waveform of the switching signal to incorporate the parameters identified in the identifying step.

12. A method for dynamically adjusting a DC-DC converter, as recited in claim 11, in which the switching signal waveform is nominally rectangular, the identifying step comprises identifying appropriate frequency and duty cycle parameters for the waveform, and the adjusting step comprises adjusting the frequency and duty cycle of the waveform.

13. A method for dynamically adjusting a DC-DC converter, as recited in claim 12, in which the identifying step further comprises the digital controller's evaluating an algorithm relating the plurality of operating states with corresponding signal frequencies and duty cycles.

14. A method for dynamically adjusting a DC-DC converter, as recited in claim 12, in which the identifying step further comprises the digital controller's accessing data pairing each operating state with a corresponding signal frequency and duty cycle, the data residing in a stored table accessible to the digital controller.

* * * * *